(12) United States Patent
Ogawa

(10) Patent No.: US 8,986,595 B2
(45) Date of Patent: Mar. 24, 2015

(54) METHOD OF PRODUCING RESIN MOLDED ARTICLE

(75) Inventor: Ryo Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 615 days.

(21) Appl. No.: 12/792,223

(22) Filed: Jun. 2, 2010

(65) Prior Publication Data

US 2010/0308507 A1    Dec. 9, 2010

(30) Foreign Application Priority Data

Jun. 4, 2009   (JP) ................. 2009-135440

(51) Int. Cl.
  *B29C 35/08*   (2006.01)
  *G02B 1/04*    (2006.01)
  *B29D 11/00*   (2006.01)

(52) U.S. Cl.
  CPC ............ *G02B 1/04* (2013.01); *B29D 11/00144* (2013.01)
  USPC ....................................................... 264/496

(58) Field of Classification Search
  USPC ....................................................... 264/496
  See application file for complete search history.

(56) References Cited

FOREIGN PATENT DOCUMENTS

| JP | 2002-302517   | * | 10/2002 |
| JP | 2005-280261 A |   | 10/2005 |
| JP | 2006-343387   | * | 12/2006 |

* cited by examiner

*Primary Examiner* — Larry Thrower
(74) *Attorney, Agent, or Firm* — Canon U.S.A., Inc. IP Division

(57) ABSTRACT

Provided is a method of producing a resin molded article which hardly involves the occurrence of optical distortion and of sink marks. The method of producing a resin molded article includes: a first step including pouring a polyfunctional (meth)acrylic monomer into a molding die and irradiating the polyfunctional (meth)acrylic monomer with radiant energy rays until a polymerization conversion degree reaches 1 to 10% to polymerize a part of the polyfunctional (meth)acrylic monomer; and a second step including heating the polymerized polyfunctional (meth)acrylic monomer after the first step in a state where the polymerized polyfunctional (meth)acrylic monomer is held in the molding die to further polymerize a remaining part of the polyfunctional (meth)acrylic monomer until the polymerization conversion degree reaches 60% or more.

4 Claims, No Drawings

METHOD OF PRODUCING RESIN MOLDED ARTICLE

BACKGROUND OF THE INVENTION

1. Field of the Invention

The present invention relates to a method of producing a resin molded article.

2. Description of the Related Art

Optical materials made of resins have been used as optical materials instead of optical glasses because of such advantages as described below. Each of the optical materials made of resins has a low specific gravity, can be reduced in weight, and is excellent in impact resistance.

Japanese Patent Application Laid-Open No. 2005-280261 describes a method of producing a resin molded article as an optical material. To be specific, first, a resin composition formed of a polyfunctional (meth)acrylate compound is polymerized with ultraviolet rays by ultraviolet irradiation until a degree of polymerization reaches 40 to 60% while a temperature is kept at 60° C. or lower. Then, the polymerized polyfunctional (meth)acrylate compound is taken out of a molding die before being subjected to thermal polymerization. The method is credited with being capable of suppressing the occurrence of a crack and of producing a resin molded article having a small coefficient of linear expansion.

SUMMARY OF THE INVENTION

However, the method of producing a resin molded article described in Japanese Patent Application Laid-Open No. 2005-280261 may involve the occurrence of optical distortion and of sink marks because the polymerization with the ultraviolet rays is performed until the degree of polymerization increases.

In view of the foregoing, an object of the present invention is to provide a method of producing a resin molded article which hardly involves the occurrence of optical distortion and of sink marks.

The present invention includes: a first step including pouring a polyfunctional (meth)acrylic monomer into a molding die and irradiating the polyfunctional (meth)acrylic monomer with radiant energy rays until a polymerization conversion degree reaches 1 to 10% to polymerize a part of the polyfunctional (meth)acrylic monomer; and a second step including heating the polymerized polyfunctional (meth)acrylic monomer after the first step in a state where the polymerized polyfunctional (meth)acrylic monomer is held in the molding die to further polymerize a remaining part of the polyfunctional (meth)acrylic monomer until the polymerization conversion degree reaches 60% or more.

Further features of the present invention will become apparent from the following description of exemplary embodiments.

DESCRIPTION OF THE EMBODIMENTS

An embodiment of the present invention is described. It should be noted that the present invention is not limited to the embodiment described below.

A method of producing a resin molded article according to this embodiment includes the following steps.

(First Step)

This step includes pouring a polyfunctional (meth)acrylic monomer into a molding die and irradiating the polyfunctional (meth)acrylic monomer with radiant energy rays until a polymerization conversion degree reaches 1 to 10% to polymerize a part of the polyfunctional (meth)acrylic monomer.

(Second Step)

This step is a thermal polymerization step including heating the polymerized polyfunctional (meth)acrylic monomer after the first step in a state where the polymerized polyfunctional (meth)acrylic monomer is held in the molding die to further polymerize a remaining part of the polyfunctional (meth)acrylic monomer until the polymerization conversion degree reaches 60% or more.

(Regarding First Step)

In the first step according to this embodiment, to be specific, first, the polyfunctional (meth)acrylic monomer is poured into the molding die at least one surface of which transmits radiant energy rays. Next, the polyfunctional (meth)acrylic monomer poured into the molding die is irradiated with the radiant energy rays until the polymerization conversion degree of the polyfunctional (meth)acrylic monomer reaches 1 to 10% so as to be polymerized.

When the polymerization is performed by the irradiation with the radiant energy rays until the polymerization conversion degree of the polyfunctional (meth)acrylic monomer exceeds 10%, the rate of the polymerization with the radiant energy rays is large, and hence the polymerization reaction progresses rapidly. As a result, the polymerization reaction becomes nonuniform, and optical distortion may occur. Further, when the polymerization conversion degree exceeds 10%, nonuniform polymerization contraction occurs in association with an increase in polymerization conversion degree. As a result, sink marks (irregularities) may occur on the surface of a polymer, and a crack may also occur.

When the polymerization is performed by the irradiation with the radiant energy rays until the polymerization conversion degree of the polyfunctional (meth)acrylic monomer reaches 1 to 10%, the polymerization reaction hardly becomes nonuniform, and hence optical distortion hardly occurs. In addition, the polymerization with the radiant energy rays results in the formation of the network structure of the polymer of the polyfunctional (meth)acrylic monomer.

The term "radiant energy rays" refers to active light beams and ionizing radiation. The term "active light beams" refers to infrared rays, visible rays, or ultraviolet rays, and light beams including ultraviolet rays are particularly preferred in this embodiment. Various light sources can be used for generating the active light beams. A low-, high-, or ultrahigh-pressure mercury lamp, a xenon discharge lamp, an arc lamp, or the like is preferably used in terms of, for example, treatment efficiency. For example, gamma rays emitted from cobalt-60, electron beams generated by an electron beam accelerator, and further, X-rays generated by an X-ray apparatus and neutron beams generated by a nuclear reactor can each be used as the ionizing radiation. Of those, the electron beams are particularly preferred because of, for example, their ease of handling and ease of availability.

When the radiant energy rays are ultraviolet rays, a glass is preferably used in the molding die that transmits the radiant energy rays lest the molding die should deteriorate or deform owing to the irradiation with the ultraviolet rays. The molding die is formed of two glasses and a gasket, and fixation with, for example, a spring clip may be performed as required. The thickness of a resin plate can be arbitrarily controlled depending on the thickness of the gasket.

The polymerization conversion degree can be determined by Fourier-transform infrared spectroscopy (FT-IR) from the amount in which the absorption peak of a double bond reduces.

A method including applying the ultraviolet rays while controlling the polymerization reaction such that the polymerization conversion degree may reach 1 to 10% is, for example, a method including applying ultraviolet rays each having a low illuminance, a method including shielding ultraviolet rays each having a certain wavelength, or a method including removing infrared rays generated from an ultraviolet light source to prevent thermal polymerization.

Of those, the method including applying ultraviolet rays each having a low illuminance is preferred. In this case, the illuminance of an ultraviolet ray having a wavelength of 365 nm is preferably set to 100 mW/cm$^2$ or less. When ultraviolet rays each having a high illuminance are applied, the polymerization reaction progresses fast, and hence it becomes difficult to control the polymerization conversion degree to a predetermined one.

A filter that absorbs ultraviolet rays is preferably used in the method including shielding ultraviolet rays each having a certain wavelength. In this case, in consideration of the absorption spectrum of an initiator for polymerization with the radiant energy rays, the use of a filter that reduces an ultraviolet ray corresponding to the maximum absorption wavelength of the initiator for polymerization with the radiant energy rays exerts a large effect.

The method including preventing a polymerizable composition from being heated with infrared rays generated from an ultraviolet light source is, for example, a method including the use of a filter that shields infrared rays, a mirror that does not reflect infrared rays, or the like.

(Regarding Second Step)

The second step according to this embodiment is a thermal polymerization step including heating the polymerized polyfunctional (meth)acrylic monomer after the first step in a state where the polymerized polyfunctional (meth)acrylic monomer is held in the molding die to further polymerize the monomer. To be specific, the polymerized polyfunctional (meth)acrylic monomer is heated so that the remaining part of the polymerized polyfunctional (meth)acrylic monomer may be polymerized until the polymerization conversion degree reaches 60% or more.

In the step, the polymerization reaction is completed by heating the polyfunctional (meth)acrylic monomer whose polymerization conversion degree is set to 1 to 10% by the irradiation with the radiant energy rays without removing the monomer from the die. When a thermal polymerization initiator is used, the heating temperature is selected at the appropriate times depending on the decomposition temperature of the initiator, and then the heating temperature is gradually increased. The final curing temperature is preferably 100° C. or higher and 220° C. or lower, or particularly preferably 120° C. or higher and 200° C. or lower. When the final curing temperature exceeds 220° C., the coloring of a resin may be remarkable. The heating time is typically 2 to 48 hours. Then, the polymerization reaction is completed so that final curing may terminate. After that, the resultant is removed from the die. There are two reasons for the fact that the final curing temperature is preferably 100° C. or higher. One reason is such that the remaining amount of the polymerization initiator keeping its activity as a radical source is reduced by sufficiently performing the deactivation (decomposition) of the polymerization initiator. The other reason is such that the polymerization conversion degree of the resin to be finally achieved is increased to the extent possible by causing the polymerization reaction to progress sufficiently.

In the thermal polymerization step, the convection of the polymerized polyfunctional (meth)acrylic monomer is suppressed by the network structure established at the time of the irradiation with the radiant energy rays in the first step. As a result, optical distortion is reduced, and the occurrence of sink marks is also suppressed. If the polymerization reaction with the radiant energy rays in the first step is not performed, the network structure of the polymer of the polyfunctional (meth)acrylic monomer is not formed, and hence optical distortion or sink marks may be apt to occur.

(Other Steps)

The method of producing a resin molded article according to this embodiment may include a step except the above first and second steps. The method may include, for example, the step of adding inorganic fine particles to the polyfunctional (meth)acrylic monomer in the molding die or the step of adding a component that initiates a polymerization reaction by irradiation with the radiant energy rays or a heating treatment (polymerization initiator) to the polyfunctional (meth)acrylic monomer as the step except the above first and second steps.

Further, the method may include the step of loading a chain transfer agent, a silane coupling agent, an antioxidant, a UV absorber, a UV stabilizer, a dye, a pigment, or a filler into the molding die to such an extent that the physical properties of a resin molded article to be obtained are not impaired.

((Meth)Acrylic Monomer)

The term "(meth)acrylic monomer" as used herein refers to a compound having one or more (meth)acryloyl groups in the molecule. In addition, the term "monofunctional (meth)acrylic monomer" as used herein refers to a compound having one (meth)acryloyl group in the molecule, and the term "polyfunctional (meth)acrylic monomer" as used herein refers to a compound having two or more (meth)acryloyl groups in the molecule. In addition, in this description, a compound having two (meth)acryloyl groups may be referred to as "bifunctional (meth)acrylic monomer," a compound having three (meth)acryloyl groups may be referred to as "trifunctional (meth)acrylic monomer," and a compound having four (meth)acryloyl groups may be referred to as "tetrafunctional (meth)acrylic monomer."

The polyfunctional (meth)acrylic monomer according to this embodiment is preferably pentaerythritol tetra(meth)acrylate.

It should be noted that, in this description, the (meth)acryloyl group is a generic name referring to an acryloyl group and a methacryloyl group, and the acryloyl group means a group represented by $CH_2=CHCO-$ and the methacryloyl group means a group represented by $CH_2=C(CH_3)CO-$.

It should be noted that, in this description, the (meth)acrylate is a generic name referring to an acrylate and a methacrylate.

Examples of the monofunctional (meth)acrylate monomer include methyl (meth)acrylate, ethyl (meth)acrylate, n-butyl (meth)acrylate, isobutyl (meth)acrylate, t-butyl (meth)acrylate, 2-ethylhexyl (meth)acrylate, n-octyl (meth)acrylate, i-octyl (meth)acrylate, lauryl (meth)acrylate, stearyl (meth)acrylate, cyclohexyl (meth)acrylate, isobornyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycidyl (meth)acrylate, tetrahydrofurfuryl (meth)acrylate, phenylglycidyl (meth)acrylate, dimethylaminomethyl (meth)acrylate, phenylcellosolve (meth)acrylate, dicyclopentenyl (meth)acrylate, biphenyl (meth)acrylate, 2-hydroxyethyl (meth) acryloylphosphate, phenyl (meth)acrylate, phenoxyethyl (meth)acrylate, phenoxypropyl (meth)acrylate, and benzyl (meth)acrylate.

(Polyfunctional (Meth)Acrylic Monomer)

Examples of the polyfunctional (meth)acrylic monomer include the following compounds.

Examples of the bifunctional (meth)acrylic monomer include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, 1,3-butylene glycol di(meth)acrylate, 1,4-butanediol di(meth)acrylate, dimethylol tricyclodecane di(meth)acrylate, neopentyl glycol di(meth)acrylate, 1,6-hexamethylene di(meth)acrylate, and hydroxypivalate neopentyl glycol di(meth)acrylate.

Examples of the trifunctional (meth)acrylic monomer include trimethylolpropane tri(meth)acrylate, pentaerythritol tri(meth)acrylate, and tris(meth)(2-acryloxyethyl) isocyanurate.

Examples of the tetra- or more functional (meth)acrylic monomer include pentaerythritol tetra(meth)acrylate, ditrimethylolpropane tetraacrylate, dipentaerythritol tetra(meth) acrylate, dipentaerythritol penta(meth)acrylate, and dipentaerythritol hexa(meth)acrylate.

It should be noted that the component that initiates a polymerization reaction by irradiation with the radiant energy rays or a heating treatment is typically an initiator for each of polymerization and thermal polymerization with the radiant energy rays. A known substance used in polymerization with the radiant energy rays can be used as the initiator for polymerization with the radiant energy rays without any particular limitation.

(Initiator for Polymerization with Radiation Energy Rays)

Specific examples of the initiator for polymerization with radiation energy rays which may be suitably used include benzoin isobutyl ether, benzoin isopropyl ether, benzoin ethyl ether, benzoin methyl ether, benzophenone, 4,4'-bis(diethylamino)benzophenone, 4,4'-bis(dimethylamino)benzophenone, 2-ethylanthraquinone, 2,4-diethylthioxanthone, 2,2-dimethoxy-2-phenylacetophenone, 1-hydroxy-cyclohexyl-phenyl-ketone, 2-hydroxy-2-methyl-1-phenyl-propan-1-one, 2,4,6-trimethylbenzoyl-diphenyl-phosphine oxide, and bis($\eta$5-2,4-cyclopentadien-1-yl)-bis(2,6-difluoro-3-(1H-pyrrol-1-yl)-phenyl)titanium. Two or more kinds of initiators for polymerization with the radiant energy rays can also be used in combination. It should be noted that an amino compound may be added as a promoter for polymerization with the radiant energy rays in addition to the initiator for polymerization with the radiant energy rays. The amino compound used as the promoter for polymerization with the radiant energy rays is, for example, 2-ethylhexyl-4-dimethylaminobenzoate.

The initiator for polymerization with the radiant energy rays is added in an amount of 0.001 part by weight or more, preferably 0.01 part by weight or more, or more preferably 0.1 part by weight or more when the total amount of the polyfunctional (meth)acrylic monomer is set to 100 parts by weight. An upper limit for the amount is typically 10 parts by weight, preferably 1 part by weight, or more preferably 0.3 part by weight. When the addition amount of the initiator for polymerization with the radiant energy rays is excessively large, the polymerization progresses rapidly, and hence the polymerization conversion degree becomes difficult to control. In addition, a hue may deteriorate. On the other hand, when the addition amount is excessively small, the polymerization may not progress sufficiently even though the radiant energy rays are applied.

(Thermal Polymerization Initiator)

Examples of the thermal polymerization initiator include an azo-based initiator and a peroxide initiator. Those known substances used in thermal polymerization can each be used without any particular limitation.

(Azo-Based Initiator)

Examples of the azo-based initiator include 2,2'-azobis isobutyronitrile, 2,2'-azobis(4-methoxy-2,4-dimethylvaleronitrile), 2,2'-azobis(2,4-dimethylvaleronitrile), dimethyl-2,2'-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamide], 1-[(1-cyano-1-methylethyl)azo]formamide, 2,2'-azobis(N-butyl-2-methylpropionamide), and 2,2'-azobis(N-cyclohexyl-2-methylpropionamide).

(Peroxide Initiator)

Examples of the peroxide initiator include benzoyl peroxide, lauroyl peroxide, di-t-butylperoxyhexahydroterephthalate, t-butylperoxy-2-ethylhexanoate, t-butylperoxyisopropylcarbonate, di-t-butylperoxide, 2,5-dimethyl-2,5-di(t-butylperoxy)hexane, 2,5-dimethyl-2,5-di(t-butylperoxy)hexyne-3, and 1,1,3,3-tetramethylbutylhydroperoxide, and t-butylhydroperoxide.

At least one kind of the thermal polymerization initiators has a 10-hour half-life temperature of room temperature to 100° C., preferably 40° C. to 90° C., or more preferably 50° C. to 80° C. in order that the occurrence of a crack and sink marks upon final curing may be suppressed and optical distortion may be reduced by utilizing thermal convection. The thermal polymerization initiators, which decompose by heating so that their concentrations may reduce, are each known to decompose at different rates depending on temperatures. The term "10-hour half-life temperature" refers to the temperature at which the concentration of an initiator reduces by half in 10 hours. One kind of those polymerization initiators may be used alone, or two or more kinds of them may be used in combination.

The thermal polymerization initiator is added in an amount of 0.001 part by weight or more, preferably 0.01 part by weight or more, or more preferably 0.1 part by weight or more when the total amount of the polyfunctional (meth)acrylic monomer is set to 100 parts by weight. An upper limit for the amount is typically 10 parts by weight, preferably 5 parts by weight, or more preferably 3 parts by weight. When the addition amount of the thermal polymerization initiator is excessively large, a hue may deteriorate. On the other hand, when the addition amount is excessively small, the thermal polymerization may not progress sufficiently.

Examples of the filler include inorganic fine particles. The term "fine particles" specifically refers to particulate substances having an average particle diameter of 100 nm or less, preferably 20 nm or less, or more preferably 10 nm or less. The average particle diameter can be typically measured by a method such as dynamic light scattering.

(Inorganic Fine Particles)

Examples of the inorganic fine particles include, but are not particularly limited to metal oxide fine particles including fine particles of oxides such as strontium oxide (SrO), titanium oxide ($TiO_2$), zirconium oxide ($ZrO_2$), niobium oxide ($Nb_2O_5$), tantalum oxide ($Ta_2O_5$), molybdenum oxide ($MoO_3$), tungsten oxide ($WO_3$, $W_2O_5$), iron oxide ($Fe_2O_3$, FeO, $Fe_3O_4$), ruthenium oxide ($RuO_2$), copper oxide (CuO, $Cu_2O$), zinc oxide (ZnO), aluminum oxide ($Al_2O_3$), indium oxide ($In_2O_3$, $In_2O$), germanium oxide ($GeO_2$, GeO), tin oxide ($SnO_2$), lead oxide (PbO, $PbO_2$), antimony oxide ($Sb_2O_3$, $Sb_2O_5$), bismuth oxide ($Bi_2O_3$), lanthanum oxide ($La_2O_3$), and cerium oxide ($CeO_2$, $Ce_2O_3$); composite oxide fine particles obtained by combining those oxides with other metals; diamond; and silica.

Hereinafter, the present invention is described more specifically by way of examples. However, the present invention is not limited to these examples. The respective evaluations in a table to be described later were performed in accordance with the following methods.

<Methods of Evaluating Resin Plate>

(1) Measurement of Total Light Transmittance

In order that a resin might be evaluated for its transparency, a total light transmittance was measured in conformity with a measurement method described in a test method for the total light transmittance of a plastic transparent material (JIS-K7361, ISO13468).

(2) Measurement of Haze

When the optical distortion of a resin and sink marks on its surface occur, light is scattered and a haze increases. In order that the resin might be evaluated for its optical distortion and sink marks, a haze (diffuse light transmittance/total light transmittance×100) was measured in conformity with a measurement method described in a method of determining the haze of a plastic transparent material (JIS-K7136, ISO14782).

(3) External Appearance (Sink Marks and Crack)

Whether or not sink marks (irregularities due to polymerization contraction) and a crack (cracking due to polymerization contraction) occurred was visually observed. The case where the sink marks were, or the crack was, not visually observable was represented as "Good," and the case where the sink marks were, or the crack was, visually observable was represented as "No Good."

<Production of Resin Plate>

EXAMPLE 1

First, 0.1 part by weight of 1-hydroxy-cyclohexyl-phenyl-ketone and 0.1 part by weight of 2,2'-azobisisobutyronitrile as initiators were mixed into 100 parts by weight of a mixture of 50 parts by weight of methyl methacrylate and 50 parts by weight of pentaerythritol tetraacrylate as a polyfunctional (meth)acrylic monomer. Then, the resultant mixture was charged into a suction bottle and subjected to vacuum deaeration. Thus, a liquid polymerizable composition was obtained.

The liquid polymerizable composition was poured into a molding die including a gasket sandwiched between a pair of quartz glasses, and was then irradiated with ultraviolet rays by using a 250-W ultrahigh-pressure mercury lamp (manufactured by HOYA CANDEO OPTRONICS CORPORATION, trade name: EX250) at an irradiation light quantity of 80 mW/cm$^2$ for 10 seconds. A polymerization conversion degree after the irradiation with the ultraviolet rays was measured. As a result, the polymerization conversion degree was 2.1%.

It should be noted that, with regard to the illuminance of an ultraviolet ray, the illuminance of an ultraviolet ray having a wavelength of 365 nm was measured with an ultraviolet integrating light quantity meter (UIT-250) and a separate type light receiver (UVD-S365) manufactured by USHIO INC.

Next, polymerization was performed by subjecting the composition to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of any crack during polymerization curing and during removal from the die, and had a good external appearance free of sink marks. In addition, its haze was measured. As a result, the haze was 0.6%, and hence the resin molded article showed good transparency. Table 1 shows the main raw material composition, and results of the evaluations, of the polymerizable composition of this example.

TABLE 1

| | Irradiation with ultraviolet rays | Conversion degree (%) | Total light transmittance (%) | Haze (%) | External appearance | | Composition (wt %) | | | Thickness (mm) |
|---|---|---|---|---|---|---|---|---|---|---|
| | | | | | Sink marks | Crack | PETeA | MMA | ZrO$_2$ | |
| Example 1 | Present | 2.1 | 94 | 0.6 | Good | Good | 50 | 50 | 0 | 2.5 |
| Example 2 | Present | 3.6 | 93 | 0.6 | Good | Good | 50 | 50 | 0 | 2.5 |
| Example 3 | Present | 6.9 | 92 | 0.8 | Good | Good | 50 | 50 | 0 | 2.5 |
| Example 4 | Present | 9.1 | 92 | 0.8 | Good | Good | 50 | 50 | 0 | 2.5 |
| Example 5 | Present | 8.8 | 92 | 0.7 | Good | Good | 50 | 50 | 0 | 1.5 |
| Example 6 | Present | 6.8 | 92 | 0.8 | Good | Good | 50 | 50 | 0 | 3.5 |
| Comparative Example 1 | Absent | NA | 91 | 2.8 | No Good | Good | 50 | 50 | 0 | 2.5 |
| Comparative Example 2 | Present | 0.0 | Unable to measure | Unable to measure | No Good | Good | 50 | 50 | 0 | 2.5 |
| Comparative Example 3 | Present | 18 | 89 | 1.7 | No Good | Good | 50 | 50 | 0 | 2.5 |
| Comparative Example 4 | Present | 47 | Unable to measure | Unable to measure | No Good | No Good | 50 | 50 | 0 | 2.5 |

In the table, PETeA represents pentaerythritol tetraacrylate, MMA represents methyl methacrylate, and ZrO$_2$ represents zirconia particles.

EXAMPLE 2

The production was performed in the same manner as in Example 1 except that the time period for which the ultraviolet rays were applied was 15 seconds.

The resultant resin molded article had a polymerization conversion degree after the irradiation with the ultraviolet rays of 3.6%, did not involve the occurrence of any crack during polymerization curing and during removal from the die, and had a good external appearance free of sink marks. In addition, its haze was measured. As a result, the haze was 0.6%, and hence the resin molded article showed good transparency. Table 1 shows the main raw material composition, and results of the evaluations, of the polymerizable composition of this example.

EXAMPLE 3

The production was performed in the same manner as in Example 1 except that the time period for which the ultraviolet rays were applied was 20 seconds.

The resultant resin molded article had a polymerization conversion degree after the irradiation with the ultraviolet rays of 6.9%, did not involve the occurrence of any crack during polymerization curing and during removal from the die, and had a good external appearance free of sink marks. In addition, its haze was measured. As a result, the haze was 0.8%, and hence the resin molded article showed good transparency. Table 1 shows the main raw material composition, and results of the evaluations, of the polymerizable composition of this example.

EXAMPLE 4

The production was performed in the same manner as in Example 1 except that the time period for which the ultraviolet rays were applied was 25 seconds.

The resultant resin molded article had a polymerization conversion degree after the irradiation with the ultraviolet rays of 9.1%, did not involve the occurrence of any crack during polymerization curing and during removal from the die, and had a good external appearance free of sink marks. In addition, its haze was measured. As a result, the haze was 0.8%, and hence the resin molded article showed good transparency. Table 1 shows the main raw material composition, and results of the evaluations, of the polymerizable composition of this example.

EXAMPLE 5

The production was performed in the same manner as in Example 1 except that the time period for which the ultraviolet rays were applied was set to 10 seconds, and the thickness of the resultant resin molded article was 1.5 mm.

The resultant resin molded article had a polymerization conversion degree after the irradiation with the ultraviolet rays of 8.8%, did not involve the occurrence of any crack during polymerization curing and during removal from the die, and had a good external appearance free of sink marks. In addition, its haze was measured. As a result, the haze was 0.7%, and hence the resin molded article showed good transparency. Table 1 shows the main raw material composition, and results of the evaluations, of the polymerizable composition of this example.

EXAMPLE 6

The production was performed in the same manner as in Example 1 except that the time period for which the ultraviolet rays were applied was set to 15 seconds, and the thickness of the resultant resin molded article was 3.5 mm.

The resultant resin molded article had a polymerization conversion degree after the irradiation with the ultraviolet rays of 6.8%, did not involve the occurrence of any crack during polymerization curing and during removal from the die, and had a good external appearance free of sink marks. In addition, its haze was measured. As a result, the haze was 0.8%, and hence the resin molded article showed good transparency. Table 1 shows the main raw material composition, and results of the evaluations, of the polymerizable composition of this example.

COMPARATIVE EXAMPLE 1

First, 0.1 part by weight of 2,2'-azobisisobutyronitrile as an initiator was mixed into 100 parts by weight of a mixture of 50 parts by weight of methyl methacrylate and 50 parts by weight of pentaerythritol tetraacrylate as a polyfunctional (meth)acrylic monomer. Then, the resultant mixture was charged into a suction bottle and subjected to vacuum deaeration. Thus, a liquid polymerizable composition was obtained.

The liquid polymerizable composition was poured into a molding die including a gasket sandwiched between a pair of quartz glasses, and then polymerization was performed by subjecting the composition to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of any crack during polymerization curing and during removal from the die, but involved the occurrence of sink marks due to polymerization contraction, and hence could not provide a good external appearance. In addition, its haze was measured. As a result, the haze was 2.8%. Table 1 shows the main raw material composition, and results of the evaluations, of the polymerizable composition of this example.

COMPARATIVE EXAMPLE 2

The production was performed in the same manner as in Example 1 except that the time period for which the ultraviolet rays were applied was 5 seconds.

The resultant resin molded article had a polymerization conversion degree after the irradiation with the ultraviolet rays of 0.0% (less than 0.5%), and the occurrence of a crack could not be observed. However, sink marks remarkably occurred, and hence haze measurement could not be performed. Table 1 shows the main raw material composition, and results of the evaluations, of the polymerizable composition of this example.

COMPARATIVE EXAMPLE 3

The production was performed in the same manner as in Example 1 except that the time period for which the ultraviolet rays were applied was 30 seconds.

The resultant resin molded article had a polymerization conversion degree after the irradiation with the ultraviolet rays of 18%, and the occurrence of a crack could not be observed. However, sink marks occurred. In addition, its haze was measured. As a result, the haze was 1.7%. Table 1 shows the main raw material composition, and results of the evaluations, of the polymerizable composition of this example.

COMPARATIVE EXAMPLE 4

First, 0.1 part by weight of 1-hydroxy-cyclohexyl-phenylketone, 0.1 part by weight of 2,4,6-trimethylbenzoyl-diphenyl-phosphine oxide, and 1.0 part by weight of 2,2'-azobis(N-butyl-2-methylpropionamide) as initiators were mixed into 100 parts by weight of a mixture of 50 parts by weight of methyl methacrylate as a (meth)acrylic monomer and 50 parts by weight of pentaerythritol tetraacrylate as a polyfunctional (meth)acrylic monomer. Then, the resultant mixture was charged into a suction bottle and subjected to vacuum deaeration. Thus, a liquid polymerizable composition was obtained.

The liquid polymerizable composition was poured into a molding die including a gasket sandwiched between a pair of quartz glasses, and was then irradiated with ultraviolet rays by using a 250-W ultrahigh-pressure mercury lamp (manufactured by HOYA CANDEO OPTRONICS CORPORATION, trade name: EX250) at an irradiation light quantity of 80 mW/cm$^2$ for 120 seconds. The molding die was left at rest on a cooled stage, and the temperature of the glass on an irradiation surface side was kept at 60° C. or lower. A polymerization conversion degree after the irradiation with the ultraviolet rays was measured. As a result, the polymerization conversion degree was 47%.

It should be noted that, with regard to the illuminance of an ultraviolet ray, the illuminance of an ultraviolet ray having a wavelength of 365 nm was measured with an ultraviolet integrating light quantity meter (UIT-250) and a separate type light receiver (UVD-S365) manufactured by USHIO INC.

Next, a heating treatment was performed in an oven at 200° C. for 4 hours. Thus, a resin molded article having a thickness of 2.5 mm was obtained.

position to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of any crack during polymerization curing and during removal from the die, and had a good external appearance free of sink marks. In addition, its haze was measured. As a result, the haze was 2.5%, and hence the resin molded article showed good transparency. Table 2 shows the main raw material composition, and results of the evaluations, of the polymerizable composition of this example.

TABLE 2

| | Irradiation with ultraviolet rays | Conversion degree (%) | Total light transmittance (%) | Haze (%) | External appearance | | Composition (wt %) | | | Thickness (mm) |
|---|---|---|---|---|---|---|---|---|---|---|
| | | | | | Sink marks | Crack | PETeA | MMA | ZrO$_2$ | |
| Example 7 | Present | 1.3 | 86 | 2.5 | Good | Good | 35 | 35 | 30 | 2.5 |
| Example 8 | Present | 1.7 | 85 | 3.1 | Good | Good | 35 | 35 | 30 | 2.5 |
| Comparative Example 5 | Absent | NA | 86 | 5.4 | No Good | Good | 35 | 35 | 30 | 2.5 |
| Comparative Example 6 | Present | 39 | Unable to measure | Unable to measure | No Good | No Good | 35 | 35 | 30 | 2.5 |
| Comparative Example 7 | Present | 41 | 87 | 17.8 | No Good | Good | 35 | 35 | 30 | 2.5 |

In the table, PETeA represents pentaerythritol tetraacrylate, MMA represents methyl methacrylate, and ZrO$_2$ represents zirconia particles.

The resultant resin molded article involved the occurrence of a crack and sink marks during polymerization curing and during removal from the die. It should be noted that its haze could not be measured, and hence a good molded article could not be obtained. Table 1 shows the main raw material composition, and results of the evaluations, of the polymerizable composition of this example.

EXAMPLE 7

First, 0.1 part by weight of 1-hydroxy-cyclohexyl-phenyl-ketone and 0.1 part by weight of 2,2'-azobisisobutyronitrile as initiators were mixed into 100 parts by weight of a mixture of 35 parts by weight of methyl methacrylate, 35 parts by weight of pentaerythritol tetraacrylate as a polyfunctional (meth) acrylic monomer, and 30 parts by weight of zirconia nanoparticles (manufactured by Sumitomo Osaka Cement Co., Ltd., average particle diameter: 7 nm). Then, the resultant mixture was charged into a suction bottle and subjected to vacuum deaeration. Thus, a liquid polymerizable composition was obtained.

The liquid polymerizable composition was poured into a molding die including a gasket sandwiched between a pair of quartz glasses, and was then irradiated with ultraviolet rays by using a 250-W ultrahigh-pressure mercury lamp (manufactured by HOYA CANDEO OPTRONICS CORPORATION, trade name: EX250) at an irradiation light quantity of 80 mW/cm$^2$ for 1 second. A polymerization conversion degree after the irradiation with the ultraviolet rays was measured. As a result, the polymerization conversion degree was 1.3%.

It should be noted that, with regard to the illuminance of an ultraviolet ray, the illuminance of an ultraviolet ray having a wavelength of 365 nm was measured with an ultraviolet integrating light quantity meter (UIT-250) and a separate type light receiver (UVD-S365) manufactured by USHIO INC. Next, polymerization was performed by subjecting the com-

EXAMPLE 8

The production was performed in the same manner as in Example 7 except that the time period for which the ultraviolet rays were applied was 2 seconds.

The resultant resin molded article had a polymerization conversion degree after the irradiation with the ultraviolet rays of 1.7%, did not involve the occurrence of any crack during polymerization curing and during removal from the die, and had a good external appearance free of sink marks. In addition, its haze was measured. As a result, the haze was 3.1%, and hence the resin molded article showed good transparency. Table 2 shows the main raw material composition, and results of the evaluations, of the polymerizable composition of this example.

COMPARATIVE EXAMPLE 5

First, 0.1 part by weight of 2,2'-azobisisobutyronitrile as an initiator was mixed into 100 parts by weight of a mixture of 35 parts by weight of methyl methacrylate, 35 parts by weight of pentaerythritol tetraacrylate as a polyfunctional (meth) acrylic monomer, and 30 parts by weight of zirconia nanoparticles (manufactured by Sumitomo Osaka Cement Co., Ltd., average particle diameter: 7 nm). Then, the resultant mixture was charged into a suction bottle and subjected to vacuum deaeration. Thus, a liquid polymerizable composition was obtained.

The liquid polymerizable composition was poured into a molding die including a gasket sandwiched between a pair of quartz glasses, and then polymerization was performed by subjecting the composition to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of any crack during polymerization curing and during removal from the die, but involved the occurrence of sink marks due to polymerization contraction, and hence could not provide a good external appearance. In addition, its haze was measured. As a result, the haze was 5.4%. Table 2 shows the main raw material composition, and results of the evaluations, of the polymerizable composition of this example.

COMPARATIVE EXAMPLE 6

The production was performed in the same manner as in Example 7 except that the time period for which the ultraviolet rays were applied was 15 seconds.

The resultant resin molded article had a polymerization conversion degree after the irradiation with the ultraviolet rays of 39%. However, a crack and sink marks remarkably occurred, and hence haze measurement could not be performed. Table 2 shows the main raw material composition, and results of the evaluations, of the polymerizable composition of this example.

COMPARATIVE EXAMPLE 7

First, 0.1 part by weight of 1-hydroxy-cyclohexyl-phenyl-ketone, 0.1 part by weight of 2,4,6-trimethylbenzoyl-diphenyl-phosphine oxide, and 1.0 part by weight of 2,2'-azobis(N-butyl-2-methylpropionamide) as initiators were mixed into 100 parts by weight of a mixture of 35 parts by weight of methyl methacrylate, 35 parts by weight of pentaerythritol tetraacrylate as a polyfunctional (meth)acrylic monomer, and 30 parts by weight of zirconia nanoparticles (manufactured by Sumitomo Osaka Cement Co., Ltd., average particle diameter: 7 nm). Then, the resultant mixture was charged into a suction bottle and subjected to vacuum deaeration. Thus, a liquid polymerizable composition was obtained.

The liquid polymerizable composition was poured into a molding die including a gasket sandwiched between a pair of quartz glasses, and was then irradiated with ultraviolet rays by using a 250-W ultrahigh-pressure mercury lamp (manufactured by HOYA CANDEO OPTRONICS CORPORATION, trade name: EX250) at an irradiation light quantity of 80 mW/cm$^2$ for 45 seconds. The molding die was left at rest on a cooled stage, and the temperature of the glass on an irradiation surface side was kept at 60° C. or lower. A polymerization conversion degree after the irradiation with the ultraviolet rays was measured. As a result, the polymerization conversion degree was 41%.

It should be noted that, with regard to the illuminance of an ultraviolet ray, the illuminance of an ultraviolet ray having a wavelength of 365 nm was measured with an ultraviolet integrating light quantity meter (UIT-250) and a separate type light receiver (UVD-S365) manufactured by USHIO INC. Next, a heating treatment was performed in an oven at 200° C. for 4 hours. Thus, a resin molded article having a thickness of 2.5 mm was obtained.

The resultant resin molded article did not involve the occurrence of any crack during polymerization curing and during removal from the die, but involved the occurrence of remarkable sink marks. It should be noted that its haze was measured, and as a result, the haze was 17.8%. Table 2 shows the main raw material composition, and results of the evaluations, of the polymerizable composition of this example.

EXAMPLE 9

First, 0.1 part by weight of 1-hydroxy-cyclohexyl-phenyl-ketone and 0.1 part by weight of 2,2'-azobisisobutyronitrile as initiators were mixed into 100 parts by weight of trimethylolpropane trimethacrylate as a polyfunctional (meth)acrylic monomer. Then, the resultant mixture was charged into a suction bottle and subjected to vacuum deaeration. Thus, a liquid polymerizable composition was obtained.

The liquid polymerizable composition was poured into a molding die including a gasket sandwiched between a pair of blue plate glasses, and was then irradiated with ultraviolet rays by using a 250-W ultrahigh-pressure mercury lamp (manufactured by HOYA CANDEO OPTRONICS CORPORATION, trade name: EX250) at an irradiation light quantity of 35 mW/cm$^2$ for 15 seconds. A polymerization conversion degree after the irradiation with the ultraviolet rays was measured. As a result, the polymerization conversion degree was 6.4%.

It should be noted that, with regard to the illuminance of an ultraviolet ray, the illuminance of an ultraviolet ray having a wavelength of 365 nm was measured with an ultraviolet integrating light quantity meter (UIT-250) and a separate type light receiver (UVD-S365) manufactured by USHIO INC. Next, polymerization was performed by subjecting the composition to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of any crack during polymerization curing and during removal from the die, and had a good external appearance free of sink marks. In addition, its haze was measured. As a result, the haze was 0.3%, and hence the resin molded article showed good transparency. Table 3 shows the main raw material composition, and results of the evaluations, of the polymerizable composition of this example.

COMPARATIVE EXAMPLE 8

First, 0.1 part by weight of 2,2'-azobisisobutyronitrile as an initiator was mixed into 100 parts by weight of trimethylolpropane trimethacrylate as a polyfunctional (meth)acrylic monomer. Then, the resultant mixture was charged into a suction bottle and subjected to vacuum deaeration. Thus, a liquid polymerizable composition was obtained.

The liquid polymerizable composition was poured into a molding die including a gasket sandwiched between a pair of blue plate glasses, and then polymerization was performed by subjecting the composition to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of sink marks during polymerization curing and during removal from the die, but involved the occurrence of a crack, and hence could not provide a good external appearance. In addition, its haze was measured. As a result, the haze was 0.4%. Table 3 shows the main raw material composition, and results of the evaluations, of the polymerizable composition of this example.

COMPARATIVE EXAMPLE 9

The production was performed in the same manner as in Example 9 except that the time period for which the ultraviolet rays were applied was 30 seconds.

The resultant resin molded article had a polymerization conversion degree after the irradiation with the ultraviolet rays of 12%, and no sink marks could be observed. However, the resin molded article involved the occurrence of a crack, and hence could not provide a good external appearance. In addition, its haze was measured. As a result, the haze was 3.2%. Table 3 shows the main raw material composition, and results of the evaluations, of the polymerizable composition of this example.

TABLE 3

| | Irradiation with ultraviolet rays | Conversion degree (%) | Total light transmittance (%) | Haze (%) | External appearance | | Composition (wt %) TMPTM | Thickness (mm) |
|---|---|---|---|---|---|---|---|---|
| | | | | | Sink marks | Crack | | |
| Example 9 | Present | 6.4 | 91 | 0.3 | Good | Good | 100 | 2.5 |
| Comparative Example 8 | Absent | NA | 91 | 0.4 | Good | No Good | 100 | 2.5 |
| Comparative Example 9 | Present | 12 | 92 | 3.2 | Good | No Good | 100 | 2.5 |

In the table, TMPTM represents trimethylolpropane trimethacrylate.

EXAMPLE 10

First, 0.1 part by weight of 1-hydroxy-cyclohexyl-phenyl-ketone and 0.1 part by weight of 2,2'-azobisisobutyronitrile as initiators were mixed into 100 parts by weight of dimethylol tricyclodecane diacrylate as a polyfunctional (meth)acrylic monomer. Then, the resultant mixture was charged into a suction bottle and subjected to vacuum deaeration. Thus, a liquid polymerizable composition was obtained.

The liquid polymerizable composition was poured into a molding die including a gasket sandwiched between a pair of blue plate glasses, and was then irradiated with ultraviolet rays by using a 250-W ultrahigh-pressure mercury lamp (manufactured by HOYA CANDEO OPTRONICS CORPORATION, trade name: EX250) at an irradiation light quantity of 35 mW/cm$^2$ for 10 seconds. A polymerization conversion degree after the irradiation with the ultraviolet rays was measured. As a result, the polymerization conversion degree was 0.7%.

It should be noted that, with regard to the illuminance of an ultraviolet ray, the illuminance of an ultraviolet ray having a wavelength of 365 nm was measured with an ultraviolet integrating light quantity meter (UIT-250) and a separate type light receiver (UVD-S365) manufactured by USHIO INC. Next, polymerization was performed by subjecting the composition to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of any crack during polymerization curing and during removal from the die, and had a good external appearance free of sink marks. In addition, its haze was measured. As a result, the haze was 1.0%, and hence the resin molded article showed good transparency. Table 4 shows the main raw material composition, and results of the evaluations, of the polymerizable composition of this example.

COMPARATIVE EXAMPLE 10

First, 0.1 part by weight of 2,2'-azobisisobutyronitrile as an initiator was mixed into 100 parts by weight of dimethylol tricyclodecane diacrylate as a polyfunctional (meth)acrylic monomer. Then, the resultant mixture was charged into a suction bottle and subjected to vacuum deaeration. Thus, a liquid polymerizable composition was obtained.

The liquid polymerizable composition was poured into a molding die including a gasket sandwiched between a pair of blue plate glasses, and then polymerization was performed by subjecting the composition to a heating treatment in an oven (at 60° C. for 12 hours, at 80° C. for 5 hours, at 100° C. for 4 hours, and at 120° C. for 2 hours). Thus, a resin molded article having a thickness of 2.5 mm was obtained.

The resultant resin molded article did not involve the occurrence of any crack during polymerization curing and during removal from the die, but involved the occurrence of remarkable sink marks, and hence could not provide a good external appearance. In addition, its haze was measured. As a result, the haze was 77.3%. Table 4 shows the main raw material composition, and results of the evaluations, of the polymerizable composition of this example.

COMPARATIVE EXAMPLE 11

The production was performed in the same manner as in Example 10 except that the time period for which the ultraviolet rays were applied was 20 seconds.

The resultant resin molded article had a polymerization conversion degree after the irradiation with the ultraviolet rays of 38%, and no crack could be observed. However, the resin molded article involved the occurrence of remarkable sink marks, and hence could not provide a good external appearance. In addition, its haze was measured. As a result, the haze was 35.6%. Table 4 shows the main raw material composition, and results of the evaluations, of the polymerizable composition of this example.

TABLE 4

| | Irradiation with ultraviolet rays | Conversion degree (%) | Total light transmittance (%) | Haze (%) | External appearance | | Composition (wt %) DCPA | Thickness (mm) |
|---|---|---|---|---|---|---|---|---|
| | | | | | Sink marks | Crack | | |
| Example 10 | Present | 0.7 | 91 | 1.0 | Good | Good | 100 | 2.5 |
| Comparative Example 10 | Absent | NA | 93 | 77.3 | No Good | Good | 100 | 2.5 |
| Comparative Example 11 | Present | 38 | 90 | 35.6 | No Good | Good | 100 | 2.5 |

In the table, DCPA represents dimethylol tricyclodecane diacrylate.

The resin molded article obtained by the present invention can be advantageously utilized in various optical materials. For example, the resin molded article can be utilized in various lenses such as a camera lens, a spectacle lens, and a microlens, and further, various optical film, sheet, and coating applications such as a functional film or sheet, an antireflection coating, and an optical multilayer coating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-135440, filed Jun. 4, 2009, which is hereby incorporated by reference herein in its entirety.

What is claimed is:

1. A method of producing a resin molded article, comprising:
a first step comprising:
irradiating a polyfunctional (meth)acrylic monomer with radiant energy rays until a polymerization conversion degree reaches 0.7 to 10% to polymerize a part of the polyfunctional (meth)acrylic monomer; and
a second step comprising heating the polyfunctional (meth)acrylic monomer which has been polymerized to a polymerization conversion degree of 0.7 to 10% after the first step to further polymerize a remaining part of the polyfunctional (meth)acrylic monomer until the polymerization conversion degree reaches 60% or more,
wherein in the first step, the polyfunctional (meth)acrylic monomer is held in a molding die, and
wherein in the second step, the polyfunctional (meth)acrylic monomer is heated in a state where the polyfunctional (meth)acrylic monomer is held in the molding die.

2. The method of producing a resin molded article according to claim 1, wherein the polyfunctional (meth)acrylic monomer contains pentaerythritol tetra(meth)acrylate.

3. The method of producing a resin molded article according to claim 1, wherein the first step further comprises the step of adding inorganic fine particles to the polyfunctional (meth)acrylic monomer in the molding die.

4. A method of producing a resin molded article, comprising:
a first step comprising irradiating a polyfunctional (meth)acrylic monomer with radiant energy rays until a polymerization conversion degree reaches 1 to 10% to polymerize a part of the polyfunctional (meth)acrylic monomer; and
a second step comprising heating the polyfunctional (meth)acrylic monomer which has been polymerized to a polymerization conversion degree of 1 to 10% after the first step to further polymerize a remaining part of the polyfunctional (meth)acrylic monomer until the polymerization conversion degree reaches 60% or more,
wherein in the first step, the polyfunctional (meth)acrylic monomer is held in a molding die, and
wherein in the second step, the polyfunctional (meth)acrylic monomer is heated in a state where the polyfunctional (meth)acrylic monomer is held in the molding die.

* * * * *